United States Patent [19]
Chiang

[11] Patent Number: 5,126,962
[45] Date of Patent: Jun. 30, 1992

[54] DISCRETE COSINE TRANSFORM PROCESSING SYSTEM

[75] Inventor: Alice M. Chiang, Weston, Mass.

[73] Assignee: Massachusetts Institute of Technology, Cambridge, Mass.

[21] Appl. No.: 551,871

[22] Filed: Jul. 11, 1990

[51] Int. Cl.⁵ ............................................. G06F 15/332
[52] U.S. Cl. .................... 364/725; 364/826; 382/56
[58] Field of Search .......... 364/725, 604, 826; 382/56

[56] References Cited

U.S. PATENT DOCUMENTS

| | | | |
|---|---|---|---|
| 4,293,920 | 10/1981 | Merola | 364/725 |
| 4,458,324 | 7/1981 | Burke et al. | 364/606 |
| 4,464,726 | 8/1984 | Chiang | 364/606 |
| 4,675,836 | 6/1987 | Arnould et al. | 364/725 |
| 4,698,689 | 10/1987 | Tzou | 364/725 |
| 4,760,543 | 7/1988 | Ligtenberg et al. | 364/725 |
| 4,791,598 | 12/1988 | Liou et al. | 364/725 |

Primary Examiner—David H. Malzahn
Attorney, Agent, or Firm—Thomas J. Engellenner; Mark G. Lappin

[57] ABSTRACT

A three dimensional (3D) discrete cosine transform (DCT) uses one dimensional DCT networks for transforming and inverse-transforming blocks of data, such as image data. The 3D DCT configuration uses DCT transform coding to remove both the spatial and temporal redundancy of a sequence of image frames to achieve high bandwidth compression.

8 Claims, 4 Drawing Sheets

DISCRETE COSINE TRANSFORM PROCESSING SYSTEM

BACKGROUND OF THE DISCLOSURE

The invention relates generally to a signal processing method and apparatus. The invention is particularly applicable to the field of image data processing and compression, for both data representative of two dimensional images and time sequences of such images.

Image compression techniques generally allow an image to be transmitted in coded form over a communications channel with a reduced number of data bits compared to that required to transmit an uncoded image. As a consequence of the reduction in data that is transmitted, the received image is generally degraded in quality from the original.

Transform coding is a known compression technique involving a transformation of image data to generate a sequence of coefficients. These coefficients can be encoded for transmission. Each coefficient may be encoded, for example, by a number of bits based upon the logarithm of the variance for a particular coefficient. At the receiver, the coded coefficient data may be used to reconstruct the original coefficients. Then the inverse of the original transform may be Performed to obtain an image representative of the original data.

One form of transform coding, block image coding, accommodates localized variations in image characteristics. With block image coding, a digitized function (here referred to as an "image") is decomposed into small rectangular regions (or "blocks") which are transform coded and transmitted through a communications channel (generally a digital channel). At the receiver, the blocks are decoded and re-assembled in order to reconstruct the image. In a typical situation, an image composed of an array of 256×256 picture elements (pixels) can be viewed as an array of 16×16 blocks, where each block contains 16×16 pixels.

The image is blocked before coding so that the data to be processed by the coder may be limited, and often permit adaptation of the coder to the particular characteristics of each block. With an efficient coding algorithm, block image coding provides significant data compression for a given picture quality.

Use of The Discrete Cosine Transform (DCT) is known to be a highly efficient way to code image data blocks, particularly when followed by an adaptive quantization scheme. The DCT is a linear transformation that generates a block of pixels, with each new pixel being a linear combination of all the input pixels of the original block. One linear transform is distinguishes from others by the set of coefficients used in the linear combinations that define each transformed pixel. The particular set used in the DCT has the property of approximating closely what would be a statistically-optimal set, and at the same time leading to a fast computation algorithm. The "almost-optimality" of the DCT implies that the degree of data compression obtained is very close to the theoretical maximum that can be achieved for any given reconstruction-error level.

The 2-dimensional (2D) DCT has been shown to be particularly useful in an image processing system for pattern recognition and noise reduction, and in a video transmission and reception system for splitting up, compressing and then transmitting video frame data followed by reconstruction of video frames in which the spatial redundancy has been removed at the transmitter by an intra-frame transform coding technique.

In addition, 2D DCT devices may be used in a high-definition television (HDTV) receiver capable of accommodating different transmission formats and different field rates, and in low-bit-rate video communication systems. Such devices can also be used in a transmitter for video transform coding to remove the spatial redundancy and for interframe motion-compensated predictive coding to remove the temporal redundancy.

However, to process a 1000-line video at 30 frame/s rate, a 2D DCT device would be required to perform more than 2 billion arithmetic operation/s. The required number of operations per second present a formidable problem for the conventional VLSI implementation. In fact, using conventional techniques, such implementation would require an extremely high level of parallel processing requiring relatively high numbers of discrete devices, large power consumption and large physical size.

Accordingly, it is an object of the present invention to provide an improved DCT-based data processing system.

Another object is to provide a high through-put, low power, low cost implementation of DCT-based data processing systems.

SUMMARY OF THE INVENTION

The present invention provides two-dimensional (2D) and three-dimensional (3-D Discrete Cosine Transform (DCT) processing systems based upon the use of a succession of one-dimensional (1D) DCT transforms. A two-dimensional (2D) DCT processing system includes a first 1D DCT network, a corner-turning memory network, and a second 1D DCT network. In the preferred form, these networks are charge domain devices, although alternative devices may be used.

The first DCT network includes an i-value parallel data input channel and a j-value parallel data output channel. The input channel is adapted to receive a succession of applied parallel data words, where each word may have up to i data values. The network is adapted to transform the applied data words in accordance with a one-dimensional (1D) discrete cosine transformation to generate a succession of parallel DCT data words, where each word is associated with one of the applied data words and has a plurality of data values. The succession of parallel DCT data words are applied to the output channel of the first 1D DCT network.

The corner turning memory network includes a j-value parallel data input channel coupled to the output channel of the first 1D DCT network. The memory network further includes an i-value parallel data output channel, and an i×j cell rectangular array of data storage locations, where each location is adapted to store a data value. The storage locations extend in the direction of an input axis from a j cell input edge of the array, and extend in the direction of an output axis to an i cell output edge of the array, where the output axis is orthogonal to the input axis.

The locations at the input edge of the corner turning memory are coupled to receive data values in parallel from the parallel data input channel of the memory, and thus from the output channel of the first 1D DCT network. The locations at the output edge are coupled to transfer data values in parallel to the parallel output channel of the corner-turning memory. The array is adapted for selectively transferring stored data values from each of its locations to the adjacent locations in the array in the direction of the input axis, and also for selectively transferring the stored data values from each of its locations to the adjacent locations in the array in the direction of the output axis. The array further includes a corner controller. The corner controller is adapted to alternately load the locations of the array with a succession of data words from the parallel data input channel and unload those locations and apply a succession of data words to the parallel data output channel of the corner-turning memory network.

The second 1D DCT network is similar to the first, and includes an i-value parallel data input channel and a j-value parallel data output channel. The input channel is adapted to receive a succession of parallel data words applied from the output channel of the corner-turning memory network, where each word has up to i data values. The second 1D DCT network is adapted to transform data words applied to its parallel data input channel in accordance with a one dimensional discrete cosine transformation (DCT to generate a succession of parallel DCT data words, where each word is associated with one of the applied data words and has a plurality of values. The succession of parallel DCT data words is applied to the output channel of the second 1D DCT network.

With this configuration, the data words at the output of the second 1D DCT network correspond to the 2D discrete cosine transform of the words applied to the first DCT network. The above system may further include a cube turning memory network and a third 1D DCT network so that a 3D discrete cosine transform of the input data may be obtained.

The cube turning memory network includes an i×j stage serial-in/parallel-out input data shift register, a K-stage parallel-in/parallel-out output data buffer and an i×j×k rectangular array of data storage locations. The input data shift register is adapted to receive a succession of j i-value serial data words and to transfer out a succession of i×j value parallel data words. The output data buffer is adapted to receive a succession of k-value Parallel data words and to transfer out the succession of k-value data words. Each location of the array is adapted to store a data value, where the locations extend in the direction of an input axis from an i×j cell input edge of the array, and extend in the direction of an output axis to a k cell output edge of the array, where the output axis is orthogonal to the input axis.

The locations at said input edge of the array are coupled to receive data in parallel from the input shift register, and the locations at the output edge are coupled to transfer data in parallel to the output buffer. The array is adapted for selectively transferring stored data values from each of its locations to the adjacent locations in the direction of the input axis, and for selectively transferring the stored data values from each of its locations to the adjacent locations in the direction of the output axis. A cube controller controls the data transfer within the array to alternately load the locations with a succession of data words from the input shift register and unload the locations and apply a succession of data words to the output buffer.

The 3D DCT processing system further includes a third 1D DCT network. The third DCT network is similar to the first two DCT networks, and includes a k-value parallel data input channel and an l value parallel data output channel. The input channel is adapted to receive a succession of parallel data words applied thereto. The network is adapted to transform data words applied to the parallel data input channel in accordance with a one dimensional cosine transformation (DCT) to generate a succession of parallel DCT data words and to apply those parallel DCT data words to the output channel. The latter words are representative of the 3D discrete cosine transform of the words applied to the first DCT network.

BRIEF DESCRIPTION OF THE DRAWINGS

The foregoing and other objects of this invention, the various features thereof, as well as the invention itself, may be more fully understood from the following description, when read together with the accompanying drawings, in which.

DESCRIPTION OF THE PREFERRED EMBODIMENT

The need for transmitting data representative of an image through a relatively low-data-rate channel is the driving force for the development of video bandwidth compression techniques. There are two basic classes of compression algorithms: intraframe and interframe coding. Intraframe coders are effective to remove spatial redundancy from within respective video frames. Interframe coders generally use some form of predictive coding based on the information in a previous frame to remove redundancy between frames. Tremendous advantages are gained by incorporating motion detection and compensation (MDC) in an interframe coder. This is due to the fact that, in an area where motion is occurring, a better prediction can be formed based on the direction of motion. Transform image coding based on the discrete cosine transform (DCT) algorithm has been shown to provide good-quality, low-bit-rate image transmission. A hybrid interframe/intraframe coder offers the potential for achieving a higher bit-rate reduction.

Figure 1:
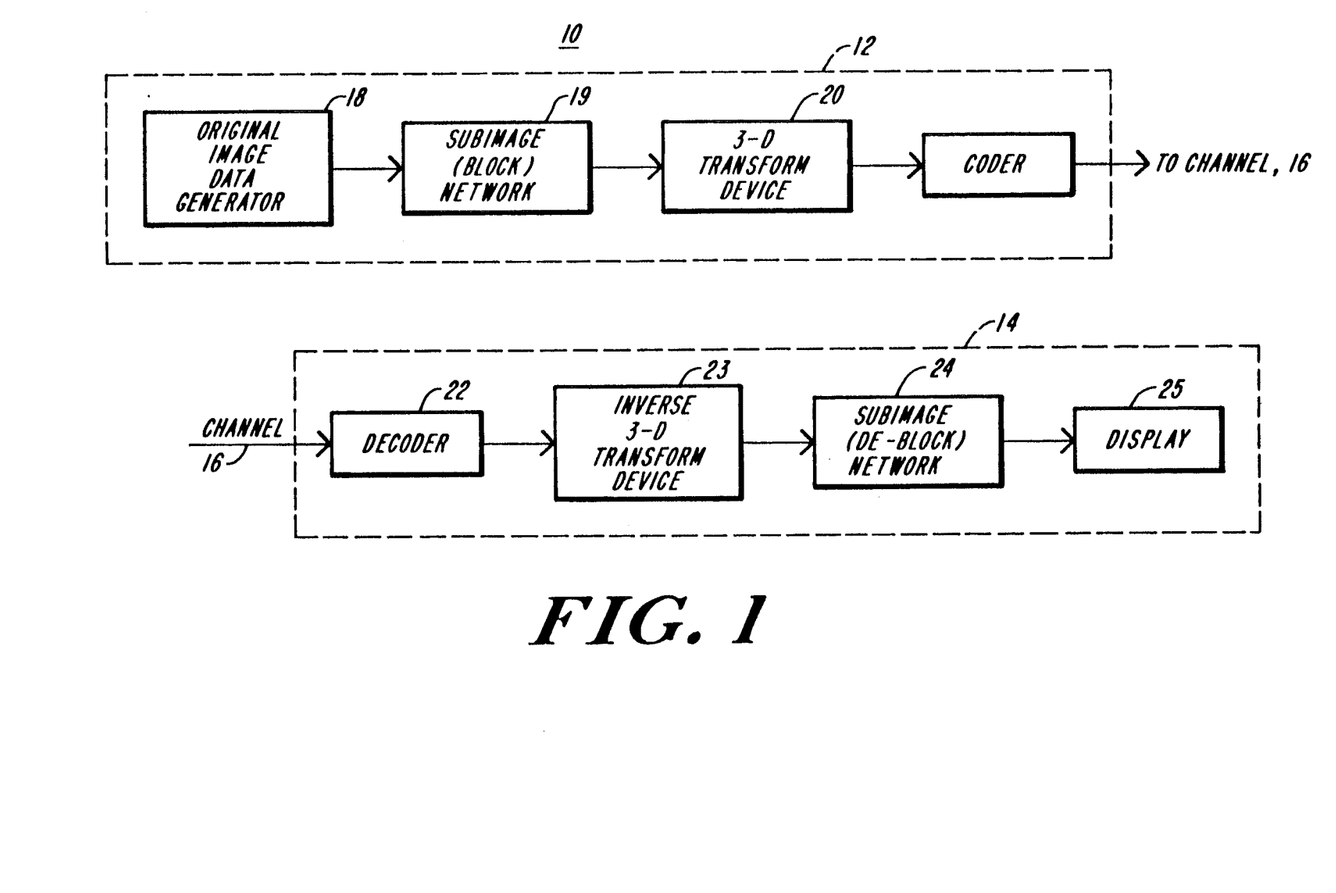
FIG. 1 shows in block diagram form an exemplary video image transmission system embodying the present invention.

The present invention provides a 3D DCT configuration based on the prior art one-dimensional DCT techniques, for transforming and inverse-transforming blocks of data, such as image data. The 3D DCT configuration uses DCT transform coding to remove both the spatial and temporal redundancy of a sequence of image frames to achieve high bandwidth compression. A block diagram of an exemplary interframe/intraframe transform coding/decoding system 10 is shown in FIG. 1.

The system 10 includes a transmitter 12 and receiver 14. The transmitter 12 is adapted to generate and to transmit encoded image data over a channel 16 to receiver 14, which in turn decodes the received data and reconstructs the original image.

The transmitter 10 includes series coupled image data generator 18, a subimage network 19, a 3D DCT transform device 20 and a motion compensation coder 21. The receiver 14 includes a series coupled motion compensation decoder 22, inverse 3D DCT transform device 23, a subimage network 24 and an image display 25.

Briefly, at transmitter 12, the image generator 18 provides image data representative of a succession of images-to-be-transmitted to receiver 14. The subimage network 19 breaks up the image data into data representative of cubic blocks of contiguous intra- and interframe pixels, where the number of pixels in a block is selected to optimize use of the subsequent hardware. The 3D DCT transform device 20 of the invention transforms each block of image data, as described below, to remove spatial and temporal redundancy, and transfers the transformed data to coder 12 for encoding and transmission over channel 16.

At receiver 14, the coded data received from channel 14 is first decoded by decoder 22, and then applied to inverse 3D DCT transform device 23. Device 23 performs a 3D DCT transform (which is the inverse of the 3D DCT transform performed by device 19) on the decoded data from decoder 22 and applies the transformed data to subimage network 24. Network 24 assembles the blocks of transformed data to regenerate data representative of the original image, which is then displayed at display 25.

The 3D transform devices 20 and 23 are constructed in accordance with the present invention and are described in detail below. In the preferred embodiment, those devices 20 and 23 include 1D DCT devices and 2D DCT devices and ancillary networks as described below.

1. 1D Discrete Cosine Transform (DCT) Device

The vector-matrix product function may be expressed as:

$$[g_1 g_2 \ldots g_K] = [f_1 f_2 \ldots f_N] \begin{bmatrix} c_{11} & c_{12} & \cdots & c_{1K} \\ c_{21} & c_{22} & \cdots & c_{2K} \\ \vdots & \vdots & & \vdots \\ c_{N1} & c_{N2} & \cdots & c_{NK} \end{bmatrix}$$

or $g_k = \sum_{n=1}^{N} f_n c_{nk}$
for $k = 1, 2, \ldots K$

Figure 2:
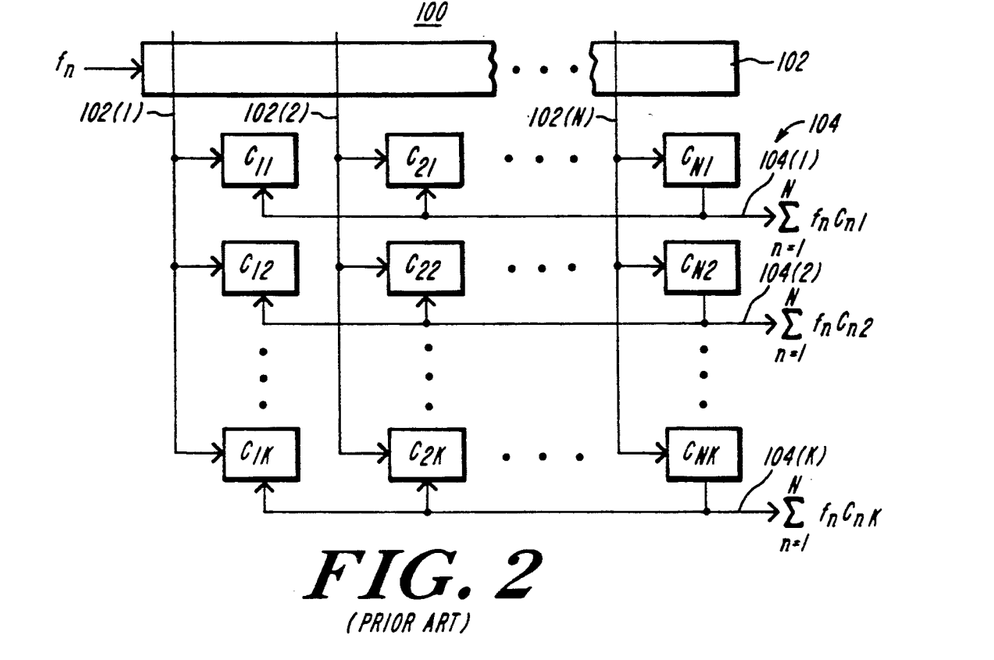
FIG. 2 shows in block diagram form a prior art vector-matrix product processor.
Figure 2A:
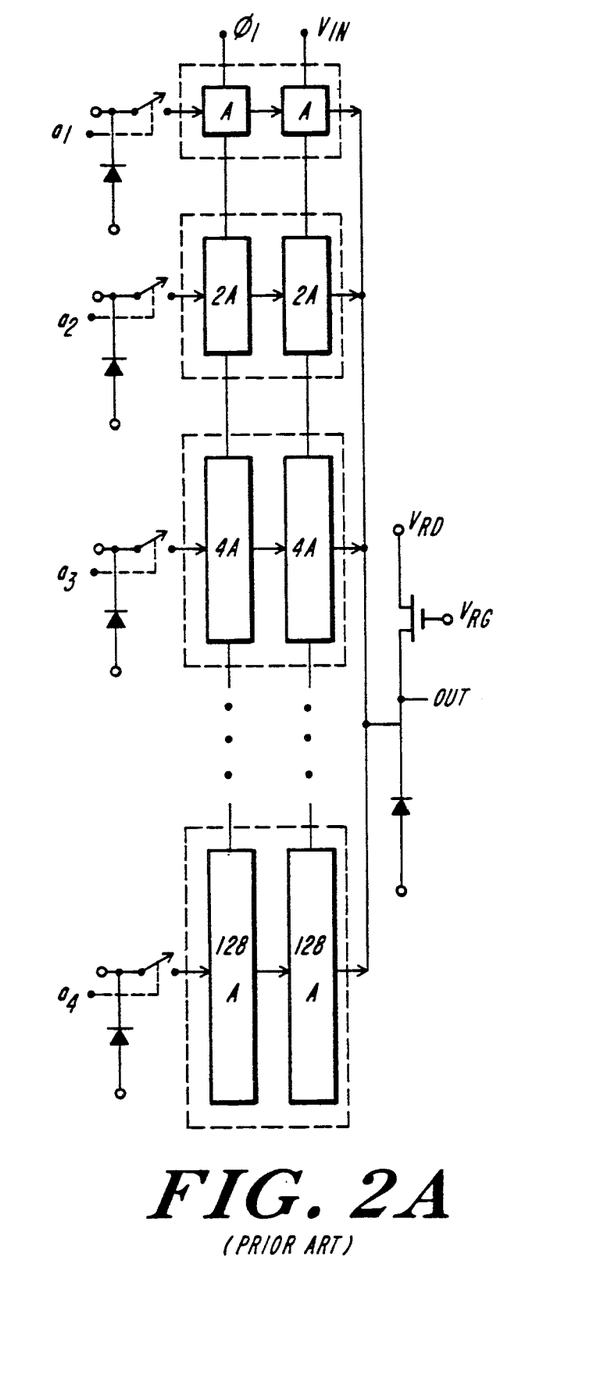
FIG. 2A shows in schematic block diagram form a prior art charge domain analog-digital multiplier.

FIG. 2 shows a device 100 which performs a vector matrix product operation in the manner disclosed in U.S. Pat. No. 4,464,726. The device 100 includes an N-point, floating-gate, tapped delay line 102 (having floating gate sensing electrodes 102(1) through 102(N) positioned along the delay line), and an N-by-K array of fixed-weight digital-analog multipliers (denoted $C_{11}$ through $C_{NK}$), for example having the form of FIG. 2. By way of example, the multipliers can have the general form shown (for an 8-bit configuration) in FIG. 2A, as described in detail in U.S. Pat. Nos. 4,464,726 and 4,458,324.

In the array of digital analog multipliers, all the multipliers on the same column have a common analog input which is coupled to the sensing electrode of the corresponding floating gate tap. All the multipliers on the same row have a common output node, where this node functions as a device for summing the charge packets applied thereto by the multipliers.

The device 100 operates as follows N analog samples of data, $f_n$, for $n = 1, 2, \ldots N$, are sequentially loaded into the CCD delay line 102 using conventional techniques for establishing and shifting charge packets in CCD's. When the N charge packets have been established in delay line 102, the summed output at the first row of multipliers (at line 104(1)) is $$\sum_{n=1}^{N} f_n c_{n1}$$

which is equal to $g_1$. In general, the summed output at the kth row is $$\sum_{n=1}^{N} f_n c_{nk}$$

which is equal to $g_k$. Therefore, the output at each row of the multiplier bank represents one element of the vector G, which is to be computed by this device 100.

In this device 100, the analog data can be continuously loaded into the CCD delay line 102. For example, after the second sampling period, the analog sampled data in the CCD delay lines are $f_{N+1}, f_N, \ldots f_3, f_2$. The corresponding output at the first row of the multiplier bank is $$\sum_{n=2}^{N+1} f_n c_{n1}$$

Similarly, the output at the kth row is $$\sum_{n=2}^{N+1} f_n c_{nk}$$

In general, after P sampling periods, the output at the kth row is $$\sum_{n=2}^{N+P-1} f_n c_{nk}$$

In general, after P sampling periods, the output at the kth row is $$\sum_{n=P}^{N+P-1} f_n c_{nk}$$

The device 100 may be configured as a 1D DCT device by configuring the input gate area of a multiplier located at the kth row and nth column to be proportional to the knth element of the cosine kernal, i.e., cos $(2\pi nk/16)$. In a preferred embodiment, device a 16 point 1D DCT device having 256 multipliers arranged in a 16×16 array. For the exemplary DCT device 100, the kth spectrum is calculated by summing the output charge from the 16 multipliers at the kth row, $$Q_{k,t} = \sum_{n=1}^{16} Q_{nk,s} + \sum_{n=1}^{16} Q_{nk,b}$$

The summed charge of each row contains the desired inner product term. This summed charge may have a different bias charge term but any lack of uniform bias charge can be corrected by adding additional fixed-weight multipliers at each row, where those multipliers generate fixed amount of charge independent of input signal, so that, the net result is to create a uniform total bias charge at every row of the DCT device. In practice, more than $-54$ dB harmonic suppression can be achieved by the 1D DCT device fabricated based on this structure.

In the DCT device 100, a 16-point cosine transform is implemented as the real part of the 16-point discrete Fourier transform. For a $16 \times 16$ image transform coding application, the 1D DCT device 30 computes the function $g_k$, where $$g_k = 2 \frac{c_k}{16} \sum_{n=0}^{15} f_n \cos\left( \frac{(2n + 1)\pi k}{32} \right)$$

$$\text{for } k = 0, 1, \ldots, 15, \text{ and } C_k = \begin{cases} \frac{1}{\sqrt{2}} & k = 0 \\ 1 & k = 1, 2, \ldots, 15 \end{cases}$$

2. 2D Discrete Cosine Transform (DCT) Device

For Pattern recognition applications, an orthogonal transformation removes spatial redundancy of an image and enables a pattern space to be transformed to a reduced-dimension feature space. This allows a classification scheme to be implemented with substantially fewer but salient features, and therefore improved performance. For pattern selections, the Karhunen-Loeve transform (KLT) is known to be optimal for minimizing transform-domain variance distributions. Unfortunately, the difficulty in computing the KLT prohibits it from being used in a real-time implementation. The transform-domain variances and mean-square error for Wiener filtering computed by the DCT are very close to that computed by the KLT and the computation of the DCT is much more straight-forward. Therefore, a DCT device is preferred for real-time pattern recognition applications.

A 2D cosine transform of an image frame data matrix [F] may be expressed in the form $$[H] = [C]^t [F][C] \quad (1)$$

where [H] is defined as two-dimensional cosine transform of the input image [F], [C] the discrete cosine kernels, and the superscript t denotes the matrix transpose. Equation (1) can be written in the form $$[H] = [G][C] \quad (2)$$

where $$[G] = [C]^t [F] \quad (3)$$

Thus, two consecutive 1D transform operations may be used to calculate the 2D transforms whereby an input image matrix [F] is transformed on a column-by-column basis through a 1D transform device. The output from each column transform is then stored in a buffer memory until the whole frame of the image is processed. The stored output forms an intermediate matrix [G]. The stored [G] matrix is then read out row by row and followed by a row transform as described by Equation (2) that completes the desired 2D transform operation.

Figure 3:
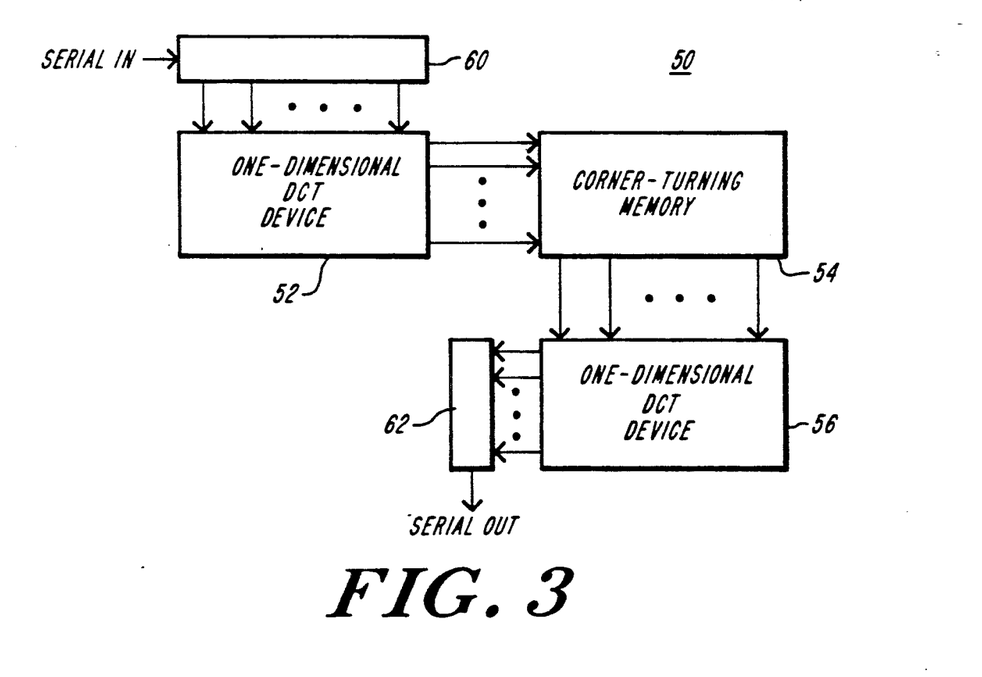
FIG. 3 shows in block diagram form a 2-dimensional Discrete Cosine Transform processing system embodying the present invention.

A block diagram of a charge-domain 2D transform device 50 based on a set of 1D operations and embodying the present invention is shown in FIG. 3. The device 50 includes a first charge domain 1D DCT device 52, a charge-domain corner-turning memory 54, and a second charge domain 1D DCT device 56. In addition, a serial-in parallel-out input shift register 60 loads the input subblock image data into the device 52 line-by-line. A parallel-in serial-out charge-domain shift register 62 reads the transformed subimage data out of device 50.

The two DCT devices 52 and 56 are used to perform the 1D row and column transforms, respectively. In order to implement Equation (2), the output data calculated from the first transform by device 52 is reformatted in memory 54 to become the input for the second transform in device 56. Thus, the memory device 54 is used both as a buffer to store the intermediate matrix [G], and is also used to perform the matrix-transpose function. More particularly, column-transformed data from the first DCT device is loaded into the memory 54 column by column until the memory is full, and the stored data is then read out of memory 54 row by row to become the input data for the DCT device 56. During the time the G matrix computed from the previous input image is being read out, a new vector of the G matrix is computed by the DCT device 52 and is stored in the buffer memory 54. In order to allow continuous device operation, the new G matrix is then read into the memory 54 row by row. The procedure repeats until the memory 54 is full again and the stored information is then read out column by column.

The charge domain buffer memory 54 consists of $16 \times 16$ storage cells and charge can be transferred in both vertical and horizontal directions. The input and output organization of the memory are parallel, i.e., parallel-in and parallel-out.

The input and output organization are arranged in such a way that each one can be in either a vertical or a horizontal, but mutually orthogonal, direction.

In the preferred embodiment for the 2D $16 \times 16$ DCT device 50, the input and output shift registers are clocked at 30 MHz. The 2D DCT device 50 block-transforms a $1000 \times 1000$ image every 30 ms (because a parallel processing architecture is used, the internal clock rate is only 1.8 MHz). The estimated chip area for the memory device 54 is less than $1 \times 1$ mm$^2$ using known fabrication techniques. The chip area for each 1D DCT device is $2 \times 2$ mm$^2$ so that the approximate chip area for the 2D $16 \times 16$ DCT device 50 is $4 \times 4$ mm$^2$. The power, chip area, and throughput rate offered by the charge-domain technology make it ideal to be used in a low-cost image transform CODEC.

3. 3D Discrete Cosine Transform (DCT) Device

A linear 3D transform of blocks of K input images, F, each with $I \times J$ pixels may be written in the form $$H_{l,m,n} = \sum_{i=1}^{I} \sum_{j=1}^{J} \sum_{k=1}^{K} W(i,j,k,l,m,n) F_{i,j,k}$$

where $F_{i,j,k}$ are elements of the input images, $H_{l,m,n}$ are three-dimensional transform coefficients of the input images and W (i,j,k;l,m,n) the elements of the transform tensor. For example, for a 3D DCT, the W can be expressed as $$W((i,j,k;l,m,n)) = g_{i,l}g_{j,m}g_{k,n}$$

where $$g_{k,n} = 2\frac{c_k}{K}\cos\left(\frac{(2n+1)\pi k}{2N}\right)$$

for $k = 0, 1, \ldots, 15$, and $C_k = \begin{cases} \frac{1}{\sqrt{2}} & k = 0 \\ 1 & k = 1, 2, \ldots, K-1 \end{cases}$ and $g_{i,l}$, $g_{j,m}$ has the similar representation as $g_{k,n}$. For applications such as interframe transform coding for video bandwidth compression in the system 10 shown in FIG. 1, the 3D transform coefficients are determined and then quantized and coded for transmission. In the receiver 14, the quantized and coded coefficients are inversely transformed, and then suitably arranged, to generate the reconstructed original image. The 3D transform i accomplished by three consecutive 1D transformations. First, a 2-dimensional frame transform along the i- and j-axis is performed on the block of data on a frame-by-frame basis, as described above in conjunction with FIG. 3.

In particular, for a given frame, the input analog image [F] is first transformed on a column-by-column basis along the j-axis through a 1D transform device. The output is then stored in a corner-turning memory until the whole frame of the image is processed. The stored matrix is then read out on a row-by-row basis and followed by a row transform along the i-axis, thus completing the desired 2D transform operation for the given frame. The procedure repeats until the 2D transform has been applied to every frame of the input images within the block. Another 1D transform on elements along the k-axis then completes the 3D transform function. Therefore, the computation of a 3D transform is accomplished by three consecutive 1D transforms.

Figure 4:
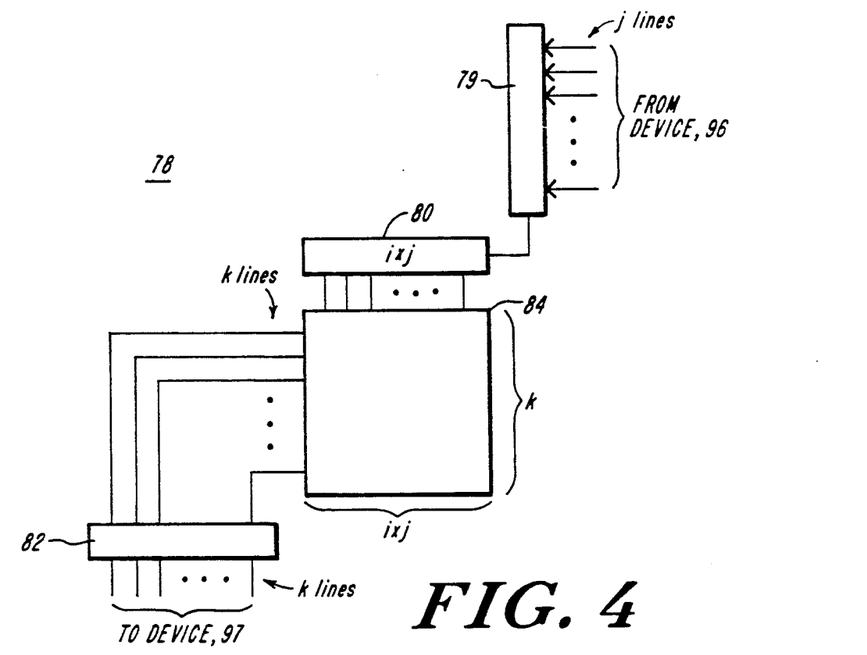
FIG. 4 shows in schematic block diagram form a cube-turning memory in accordance with the present invention.

To support a continuous real-time operation, a VLSI implementation provides an on-chip buffer memory that is capable of reading in K frames of data on a frame-by-frame basis along the ij-plane, and reformatting the block of data, so a vector along the k-axis can be read out on a line-by-line basis across the ij-planes. The memory is referred to below as a cube-turning memory 78. The size of the cube turning memory 78 is selected to store K frames of images, each with I×J Pixels.

A block diagram of cube-turning memory 78 is shown in FIG. 4. Memory 78 consists of an I×J-stage input horizontal serial shift register 80, a K-stage output vertical parallel-in/parallel-out buffer 82 and I×J long by K wide storage well array 84 which can be clocked in both vertical and horizontal directions.

Memory 78 operates as follows. The first frame of input images is serially loaded into the memory 78 from a parallel-in/serial-out buffer register 79 on a line-by-line basis until the input shift register 80 is filled. The whole frame of the image (loaded in as an I×J line is then parallel transferred to the storage well array 84. The second frame of the input images is then loaded into the shift register 80 until it is filled. The whole frame of data is then parallel transferred to the storage well array 84, while at the same time, the stored first frame data is shifted down one position in array 84. The procedure repeats until the whole block of images are stored in the I×J×K storage well array 84. A read-out process is then followed, in which the stored data is horizontally clocked in parallel and at every clock one K-element vector is first transferred to the output buffer 82.

Figure 5:
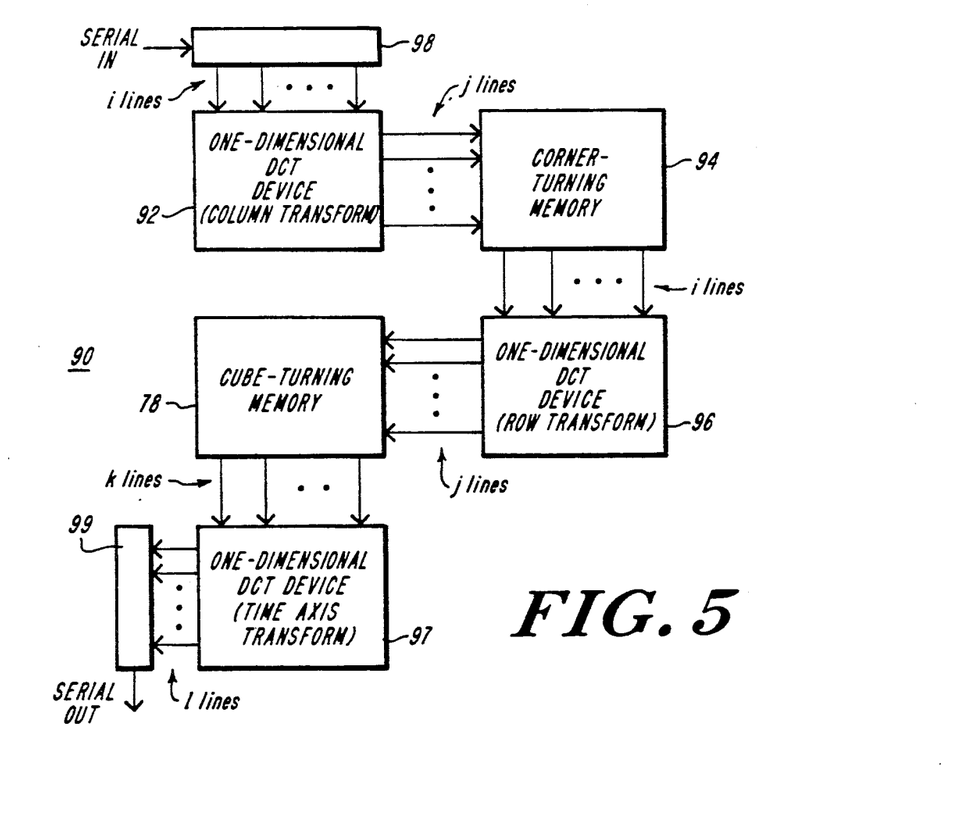
FIG. 5 shows in block diagram form a 3-dimensional Discrete Cosine Transform processing system embodying the present invention.

A block diagram of a 3D DCT device 90 is shown in FIG. 5. The device 90 includes a first charge domain 1D DCT device 92, a charge-domain corner-turning memory 94, and to compute the 2D transform for a given frame, a second charge domain 1D DCT device 96. This portion is substantially the same as the 2D DCT system 50 shown in FIG. 3. The third transformation is accomplished by applying the 2D transformed data (from network 96) to a charge domain cube-turning memory 78 and a third charge domain 1D DCT device 97 to complete the transformation along the temporal axis. The third DCT network 97 is substantially the same as the first and second DCT networks, except that it has k parallel inputs and 1 parallel outputs.

In addition, a serial-in-parallel-out charge domain shift register 98 loads the input sub-block image into the device 72 line-by-line, and a parallel-in serial-out charge domain shift register 99 reads the transformed subimage out.

Thus, the 3D DCT device 90 is based on a parallel and pipeline processing architecture. The throughput rate of this device is limited only by the input and output shift registers. With the shift registers clocked at 30 MHz, the 3D 8×8×8 DCT device can block-transform an 8 1000×1000 image every 240 ms (because a parallel processing architecture is used, the internal clock rate is only 3.8 MHz). Using a 2 μm design rule and a double-poly, double-metal process, the approximate chip area for the corner-turning memory device is less than 0.25 mm², the cube-turning memory is 0.7 mm². The chip area for the 1D 8×8 DCT device is 1.2 mm². The approximate total chip area for the 3D DCT device is less than 3.6×2.4 mm. The approximate total power dissipation is less than 400 mW. The power, chip area, and throughput rate offered by the charge-domain technology make it ideal to be used in a low-cost image transform CODEC.

In particularly efficient forms of the invention, through-put may be maximized by, on an alternate frame basis, gating the data in the corner-turning memory to switch the roles of the input and output axis. That is, as data is being clocked out from the memory to the second DCT network "row-by-row", new data from the 1D DCT network may be clocked in to replace each vacated "row" (but now a "column"). As a result, continuous usage of the array may be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A data processing system comprising:
   A. a first 1D DCT network, said first DCT network having an i-value parallel data input channel for receiving a succession of parallel data words applied thereto, each word having up to i data values, and having a j-value parallel data output channel, and including means for transforming said applied data words in accordance with a one dimensional discrete cosine transformation (DCT) to generate a succession of parallel DCT data words, each word being associated with one of said applied data words and having a plurality of data values, and for applying said succession of parallel DCT data words to said output channel, B. a corner turning memory network having a j-value parallel data input channel, an i-value parallel data output channel, and an i×j cell rectangular array of data storage locations, each location being adapted to store a data value, said locations extending in the direction of an input axis from a j cell input edge of said array, and extending in the direction of an output axis to an i cell output edge of said array, said output axis being orthogonal to said input axis, wherein said locations at said input edge are coupled to receive data values in parallel from said parallel data input channel, and said locations at said output edge are coupled to transfer data values in parallel to said parallel output channel, wherein said array includes first means for selectively transferring stored data values from each of said locations to the adjacent locations in said array in the direction of said input axis, and includes second means for selectively transferring said stored data values from each of said locations to the adjacent locations in said array in the direction of said output axis, and wherein said array further includes a corner controller having means for controlling said first and second transferring means of said array to be operative alternately to load said locations with a succession of data words from said parallel data input channel and to unload said locations and apply a succession of data words to said parallel data output channel, C. a second 1D DCT network, said second DCT network having an i-value parallel data input channel for receiving a succession of parallel data words applied thereto, each word having up to i data values, and having a j-value parallel data output channel, and including means for transforming data words applied to said parallel data input channel in accordance with a one dimensional discrete cosine transformation (DCT) to generate a succession of parallel DCT data words, each being associated with one of said applied data words and having a plurality of values and for applying said succession of parallel DCT data words to said output channel, D. means for coupling said output channel of said first DCT network to said input channel of said corner turning memory network, and E. means for coupling said output channel of said corner turning memory network to said input channel of said second DCT network.

2. A system according to claim 1 further comprising:

F. a cube turning memory network having:

an i×j stage serial-in/parallel-out input data shift register adapted to receive a succession of j i-value serial data words and to transfer out a succession of i×j value parallel data words, a k stage parallel-in/parallel-out output data buffer including means for selectively receiving a succession of k-value parallel data words and for selectively transferring out a succession of k-value parallel data words, an i×j×k cell rectangular array of data storage locations, each location being adapted to store a data value, said locations extending in the direction of an input axis from an i×j cell input edge of said array, and extending in the direction of an output axis to a k cell output edge of said array, said output axis being orthogonal to said input axis, wherein said locations at said input edge are coupled to receive data in parallel from said input shift register, and said locations at said output edge are coupled to transfer data in parallel to said output buffer, wherein said array includes first means for selectively transferring stored data values from each of said locations to the adjacent locations in said array in the direction of said input axis, and includes second means for selectively transferring said stored data values from each of said locations to the adjacent locations in said array in the direction of said output axis, and wherein said array further includes a cube controller having means for controlling said first and second transferring means of said array to be operative alternately to load said locations with a succession of data words from said input shift register and to unload said locations and apply a succession of data words to said output buffer, G. a third 1D DCT network, said third DCT network having a k-value parallel data input channel for receiving a succession of parallel data words applied thereto, and an l-value parallel data output channel, and including means for transforming data words applied to said parallel data input channel in accordance with a one dimensional cosine transformation (DCT) to generate a succession of parallel DCT data words and for applying said parallel DCT data words to said output channel, and H. means for coupling said output shift register of said cube turning memory network to said input channel of said third DCT network, said coupling means including means for applying said K-value data words in parallel to said parallel input channel of said third DCT network.

3. A system according to claims 1 or 2 wherein said values are represented by analog signals comprising a plurality of charge packets, and wherein said first DCT network, said second DCT network, and said corner turning memory network are charge coupled devices (CCD's).

4. A system according to claims 1 or 2 further comprising:

A. an i-stage serial-in/parallel-out input data shift register, said shift register having a serial data input channel adapted to receive a succession of i-value serial input data words, and said shift register having a i-value parallel data output channel coupled to the respective stages of said shift register, and B. means for coupling said output channel of said shift register to said input channel of said first DCT network.

5. A system according to claim 4 wherein said values are represented by analog signals comprising a plurality of charge packets, and wherein said shift register is a charge coupled device (CCD).

6. A system according to claim 4 wherein said third DCT network and said cube turning memory network are charge coupled devices (CCD's).

7. A cube turning memory network having:
an i×j stage serial-in/parallel-out input data shift register adapted to receive a succession of j i-value serial data words and to transfer out a succession of i×j value parallel data words,
a k stage parallel-in output data shift register adapted to receive a succession of k-value parallel data words and to transfer out a succession of k-value data words,
an i×j×k cell rectangular array of data storage locations, each location being adapted to store a data value, said locations extending in the direction of an input axis from an i×j cell input edge of said array, and extending in the direction of an output axis to a k cell output edge of said array, said output axis being orthogonal to said input axis,
wherein, said locations at said input edge are coupled to receive data in parallel from said input shift register, and said locations at said output edge are coupled to transfer data in Parallel to said output shift register,
wherein said array includes first means for selectively transferring stored data values from each of said locations to the adjacent locations in said array in the direction of said input axis, and includes second means for selectively transferring said stored data values from each of said locations to the adjacent locations in said array in the direction of said output axis, and
wherein said array further includes a cube controller having means for controlling said first and second transferring means of said array to be operative alternately to load said locations with a succession of data words from said input shift register and to unload said locations and apply a succession of data words to said output shift register.

8. A system according to claim 7 wherein said values are represented by analog signals comprising a plurality of charge packets, and wherein said input shift register, said output shift register, and said array are charged coupled devices (CCD's).

* * * * *

UNITED STATES PATENT AND TRADEMARK OFFICE
CERTIFICATE OF CORRECTION

PATENT NO. : 5,126,962
DATED : June 30, 1992
INVENTOR(S) : Alice M. Chiang

It is certified that error appears in the above-indentified patent and that said Letters Patent is hereby corrected as shown below:

Column 1, line 6, insert

-- This invention was made with Government support under Contract Number F19628-85-C-0002 awarded by the U.S. Air Force. The Government has certain rights in the invention. --

Signed and Sealed this

Fourteenth Day of December, 1993

Attest:

BRUCE LEHMAN

*Attesting Officer*    *Commissioner of Patents and Trademarks*